United States Patent Office 3,472,633
Patented Oct. 14, 1969

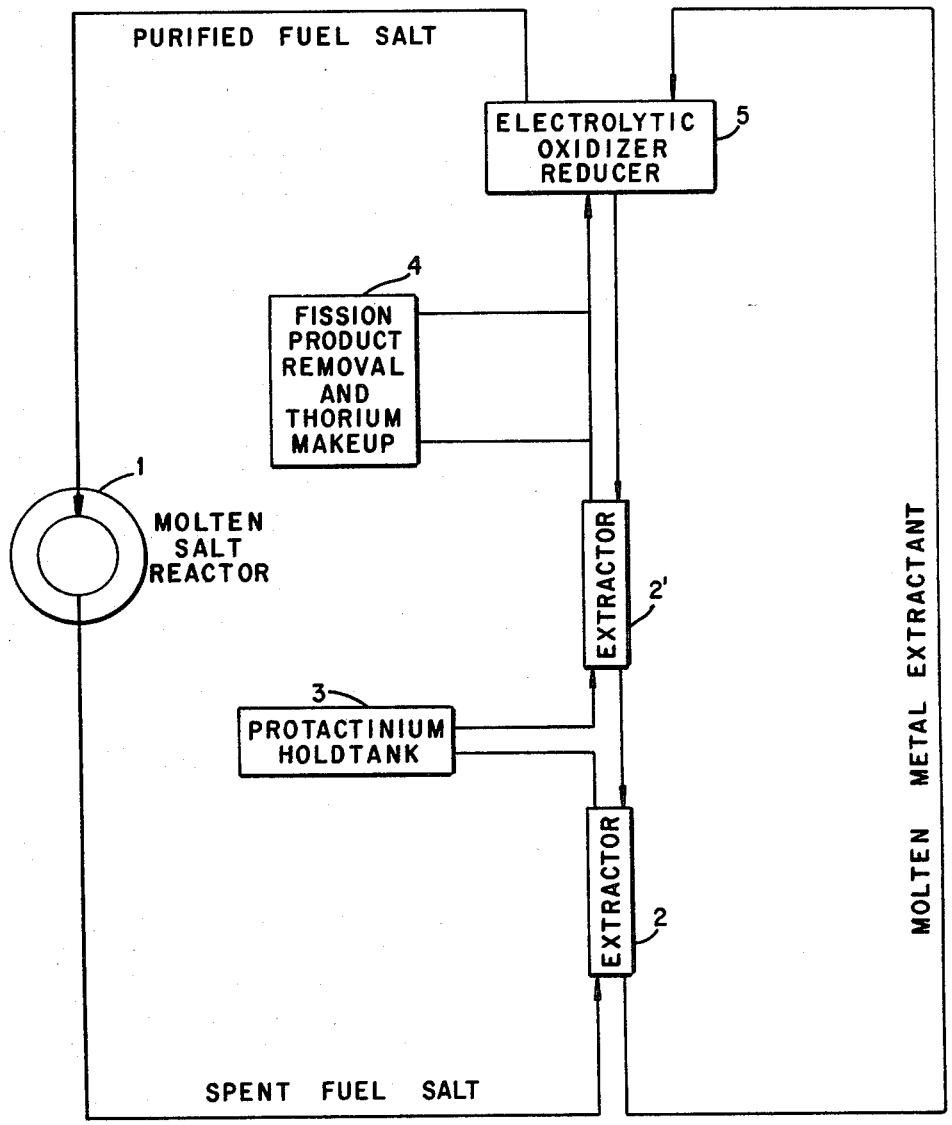

---

3,472,633
LIQUID-LIQUID REMOVAL OF PROTACTINIUM FROM SPENT MOLTEN SALT MIXTURES CONTAINING URANIUM TETRAFLUORIDE
Leonard E. McNeese, Oak Ridge, Jack S. Watson, Knoxville, and Marvin E. Whatley, Oak Ridge, Tenn., assignors to the United States of America as represented by the United States Atomic Energy Commission
Filed Aug. 2, 1968, Ser. No. 749,724
Int. Cl. C01g 43/06, 57/00
U.S. Cl. 23—325                                     7 Claims

ABSTRACT OF THE DISCLOSURE

A continuous liquid-liquid countercurrent extraction method for reprocessing spent molten fluoride salt reactor fluids containing uranium tetrafluoride is provided whereby the uranium values are reductively extracted into an immiscible molten metal solution containing a metal reductant selected from the group consisting of lithium and thorium while the protactinium values are held up and concentrated in the extractor by a continuous reflux.

BACKGROUND OF THE INVENTION

The invention was made in the course of, or under, a contract with the United States Atomic Energy Commission. It relates generally to methods for reprocessing nuclear reactor fuels and more particularly to a continuous liquid-liquid countercurrent reductive extraction method for purifying spent molten fluoride salt fuels of bred-in protactinium.

Of recent importance is the determination that a single fluid, double region molten salt breeder reactor, which is described in greater detail in copending application Ser. No. 733,843, filed on June 3, 1968, in the names of Edward S. Bettis et al. for "Single Fluid Molten Salt Nuclear Breeder Reactor," is feasible. It is well known in the reactor art that in order for a molten salt breeder reactor to operate efficiently means must be provided for the continuous or periodic removal of the bred-in protactinium-233. Reactor criteria for breeding purposes require that no more than 10% of the protactinium values be present in the circulating stream in order to avoid loss of protactinium-233 as well as neutrons needed for conversion of fertile thorium-232 to fissile uranium-233.

In ORNL Report 4119, "Molten-Salt Reactor Program Semiannual Progress Report for Period Ending Feb. 28, 1967," there were reported half-cell potentials for uranium (1.28 v.), protactinium (1.32 v.), thorium (1.47 v.) and lithium (1.80 v.). These data indicated that uranium and protactinium might be separated from each other. It is therefore highly desirable to provide a process for continuously removing protactinium values from spent molten salt breeder reactor fluids containing uranium values, employing conventional chemical processing technology.

SUMMARY OF THE INVENTION

This object was achieved by the discovery that in a liquid-liquid extractor the protactinium values could be made to reflux continuously and be concentrated in a portion of the molten salt during its residence in the extractor while the uranium is removed from the spent molten salt as it enters the bottom of the extractor. More specifically, the invention comprises countercurrently introducing into a liquid-liquid extractor spent molten metal fluoride salt fluids containing uranium tetrafluoride and an immiscible molten bismuth mixture containing a reductant selected from the group consisting of lithium and thorium and adjusting the quantity of metal reductant introduced to provide a stoichiometric excess of the reductant with respect to uranium tetrafluoride to thereby extract from the salt phase substantially all of the said uranium as reduced metal values into the bismuth phase as the molten salt enters the extractor while the protactinium values (protactinium-233 tetrafluoride) are held up and concentrated within the extractor by continuous reflux. With reference to a 1000 mwe. molten salt breeder reactor having a core volume of 1042 ft.$^3$, a breeding ratio of 1.05 and a core salt having a composition of

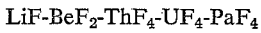

$LiF\text{-}BeF_2\text{-}ThF_4\text{-}UF_4\text{-}PaF_4$ (67.68–20.0–12.0–0.3–0.004 mole percent), the present process, operating on a reprocessing time cycle of 3–5 days (withdrawing approximately 347 ft.$^3$ salt/day), can maintain the protactinium-233 concentration level below 0.004 mole percent which is well within the hereinbefore cited reactor limits. One aspect of the present reprocessing method, which is of significant benefit, is the fact that the reflux and concentration of the protactinium values may be effected in a hold tank provided in the center of the extractor and as the protactinium-233 decays to uranium-233 the uranium values are then extracted into the molten bismuth and pass out the bottom of the extractor.

BRIEF DESCRIPTION OF THE DRAWING

The sole drawing is a flow diagram of a continuous liquid-liquid countercurrent extraction process for reprocessing spent molten fluoride salt fluids withdrawn from reactor 1 containing uranium tetrafluoride of dissolved protactinium values and includes: a liquid-liquid extractor which is comprised of two equal 6-stage extraction towers 2 and 2', wherein uranium is extracted into a countercurrently flowing stream of molten bismuth containing thorium and/or lithium while the protactinium is held up and concentrated by continuous reflux; a hold tank 3 wherein the refluxed protactinium values are maintained until their decay to uranium-233; fission product removal and thorium makeup facilities 4; and an electrolytic oxidizer-reducer 5 wherein uranium, protactinum, lithium, and thorium metals dissolved in the recycled molten bismuth stream are selectively oxidized to fluorides in the presence of the purified molten salt stream for return to the reactor and metal reductant is added to the bismuth stream prior to recycle into the extractor.

DESCRIPTION OF THE PREFERRED EMBODIMENT

In practicing the invention a portion of the molten salt, which may, for example, comprise a single fluid, double region fuel of $LiF\text{-}BeF_2\text{-}ThF_4\text{-}UF_4\text{-}PaF_4$ (68.0–19.7–12.0–0.3–0.004 mole percent) is withdrawn from the reactor and passed to the extractor where it is contacted countercurrently with a molten bismuth stream which enters the top of the extractor. It is critical to the successful practice of the invention that the process parameters be controlled in such a manner as to effect removal of substantially all of the uranium from the spent molten salt stream in the lower part of the extractor while the protactinium, which is more electropositive than uranium, proceeds up the extractor and is caused to reflux within the extractor. While there are a number of variable process parameters, i.e., flow rate of the molten salt and bismuth streams, it has been found that the process could be readily controlled by adjusting the quantity of metal reductant, which may be thorium and/or lithium metal, introduced into the bismuth stream as it enters the top of the extractor. Thus, where the number of moles of metal reductant passed into the top of the extractor is approximately equal to the amount of oxidized material, i.e., uranium tetrafluoride and protactinium tetrafluoride, passed up the extractor, the uranium is removed from the bottom of the extractor and flows to the anode of the electrolytic reducer where it is oxidized, and the protactinium is trapped within the extractor under continuous reflux. Where, for example, the uranium tetrafluoride and protactinium tetrafluoride concentrations entering the extractor are 0.003 and 0.00004 mole fraction, respectively, a suitable metal reductant concentration is 0.003 mole fraction in thorium, which is added to the bismuth stream (flow rate ~371 ft.$^3$ bismuth/day) as it enters the top of the extractor. Although the concentrations of uranium tetrafluoride and thorium are equal, the molar flow rate of metal is slightly higher than that of salt thereby providing a slight stoichiometric excess of reductant.

With regard to establishing reflux conditions within the extractor, it may be seen that after the uranium is reduced by the metal reductant to uranium metal and extracted into the bismuth phase at the bottom of the extractor the protactinium-containing salt, essentially free of uranium, progresses up the extractor until it is also reduced to metal by the metal reductant and extracted into the bismuth phase. The bismuth stream containing the extracted protactinium values then proceeds down the extractor whereupon the protactinium is oxidized to the fluoride by uranium tetrafluoride, which is dissolved in the entering spent molten fluoride salt stream, and caused to transfer back into the salt phase. In this way it will be apparent that the protactinium values are trapped and refluxed in the center of the extractor in a manner analogous to trapping components of intermediate volatility in a distillation column. The metal reductant may be selected from thorium or lithium. Inasmuch as the reductant is electrolytically reduced from a molten salt containing both lithium and thorium fluorides, a mixture of lithium and thorium, which may vary in their respective proportions, may be equally suitable.

The isolation of the protactinium values by refluxing within the extractor requires a tower equivalent to several extraction stages. It should be apparent that the extractor design, which is based on successive stage by stage application of equilibrium relationships and material balances, will vary with the inlet and outlet concentrations. A suitable extractor design for the hereinbefore mentioned system having inlet concentrations for uranium tetrafluoride and protactinium tetrafluoride of 0.003 and 0.00004 mole fraction respectively, is two 6-stage towers.

A hold tank is provided in the center of the extractor where protactinium-233 tetrafluoride is concentrated and retained until its decay to uranium-233. Advantageously, the present process provides for the removal of the uranium-233 as it is formed. This will be observed by the fact that any uranium-233 formed in the hold tank will be reduced into the bismuth stream and will pass out the bottom of the extractor.

The uranium consisting of that material extracted into the bismuth stream as the molten salt enters the bottom of the extractor as well as that resulting from decay of protactinium-233, is transported to an electrolytic oxidizer-reducer at the top of the extractor. The electrolytic oxidizer-reducer serves the dual purpose of recovering the extracted uranium from the bismuth stream and also serves in preparing the thorium-lithium-bismuth solution to be fed to the top of the extractor. It will be appreciated here that other suitable conventional means such as hydrofluorination of the bismuth stream in the presence of a molten salt for uranium removal followed by addition of metallic lithium and/or thorium to the returned bismuth stream may be substituted for the electrolytic oxidizer-reducer within the scope of this invention and that this particular method is given by way of illustrating a preferred embodiment. The bismuth solution containing the extracted uranium values serves as the anode in the electrolytic cell where most of the uranium, lithium, protactinium, and thorium contained in the bismuth solution are converted to fluorides. The electrolyte for this cell is purified molten fluoride salt from the top of the extractor which first passes over a pool of bismuth serving as the cathode into which thorium and lithium are reduced for preparing the bismuth stream to be fed to the extractor. The electrolyte salt passes upward through the electrolytic oxidizer-reducer countercurrent to a downward flow of bismuth droplets from the anode, across the anode mixing with the uranium and lithium fluorides produced by the oxidation step and subsequently out of the system and back to the reactor.

As noted hereinbefore the process is readily controlled by adjusting the quantity of metal reductant added to the bismuth stream. The quantity of metal reductant may be adjusted by controlling the amperage through the electrolytic oxidizer-reducer. The amperage should be controlled such that the proper concentration of uranium will be present in the molten salt entering the protactinium decay tank. The uranium concentration may be measured by suitable means such as fluorination of a portion of the stream and analysis of the resulting gas stream for $UF_6$ by conventional means. Control of the uranium concentration in salt entering the decay tank is sufficient process control since the nobility of protactinium relative to uranium determines the protactinium distribution in the extractor. If the amperage is too low, a substantial part of the uranium will remain in the salt and with the protactinium will pass out of the top of the extractor; in this case, the uranium concentration in salt entering the decay tank will be much greater than the proper value. If the amperage is too high, a substantial part of the protactinium will remain in the bismuth stream and will pass out of the bottom of the extractor; in this case, the uranium concentration in salt entering the decay tank will be much lower than the proper value. For the hereinbefore mentioned system the required amperage is 6700 amps (at a current efficiency of 100%).

In the event it is desirable to remove the fission products, this may be effected by withdrawing a portion of the purified molten salt stream as it leaves the extractor and further processing it by any of several means, such as by rare earth exchange with solid $UF_3$.

Some of the fission products may be trapped in the protactinium-233 extraction system either in the bismuth phase or the molten salt phase depending on their nobility relative to uranium, protactinium and thorium. This may necessitate periodic withdrawal and replacement of a portion of the bismuth.

The temperature at which the protactinium isolation system is operated may vary over a wide range. In general, both streams should be maintained at a temperature above the liquidus temperature of the particular molten fluoride salt employed. To insure a safe margin for process control, it is preferred that the temperature of the two streams be maintained at least 50° C. above the liquidus temperature of the molten salt. Higher temperatures may increase the corrosion rate of container materials and the complexity of operation. In any event temperatures above 900° C. are not recommended. For a single fluid, double region molten salt composition of $LiF-BeF_2-ThF_4-UF_4$ (67.68–20.0–12.0–0.3 mole percent) the preferred reprocessing temperature range is 550°–700° C.

What is claimed is:

1. A continuous method for reprocessing spent molten fluoride salt reactor fluids containing uranium tetrafluoride of dissolved protactinium values comprising the steps of:
   (a) countercurrently introducing into a liquid-liquid extractor said molten salt and a bismuth molten solution containing a metal reductant selected from the group consisting of lithium and thorium,
   (b) adjusting the quantities of said reductant introduced into said extractor to provide a stoichiometric excess of said reductant with respect to uranium tetrafluoride whereby said uranium values are extracted into said bismuth and removed from the extractor and said protactinium values are recycled and concentrated within said extractor, and (c) recovering said extracted uranium values from said bismuth solution.

2. The method of claim 1 wherein said spent molten fluoride salt fluid comprises $LiF$-$BeF_2$-$ThF_4$-$UF_4$-$PaF_4$ (68.0–19.7–12.0–0.3–0.004 mole percent).

3. The method of claim 1 wherein said reprocessing operation is conducted at a temperature within the range of 550–700° C.

4. The method of claim 1 wherein said metal reductant is selected from the group consisting of thorium, lithium, and mixtures thereof.

5. The method of claim 4 wherein said reductant concentration is approximately 0.003 mole fraction in thorium.

6. The method of claim 1 wherein said recovery of said extracted uranium values from said bismuth solution comprises contacting said bismuth with a purified molten salt fluid and oxidizing said uranium metal to uranium tetrafluoride whereby said uranium tetrafluoride is transferred into the molten salt phase from the metal phase.

7. The method of claim 6 wherein said oxidation operation is conducted in an electrolytic cell in which said bismuth solution containing uranium is the anode, said bismuth leaving the anode is the cathode, and said purified molten salt is the electrolyte.

References Cited

UNITED STATES PATENTS

| | | | |
|---|---|---|---|
| 3,395,991 | 8/1968 | Grimes et al. | 23—325 |
| 3,310,500 | 3/1967 | Kelly | 23—325 |
| 3,130,042 | 4/1964 | Teitel | 23—325 |

OTHER REFERENCES

Bareis et al., Fused Salts for Removing Fission Products From U-Bi Fuels, Nucleonics 12, No. 7, 1954, 16–19.

CARL D. QUARFORTH, Primary Examiner

MICHAEL J. McGREAL, Assistant Examiner

U.S. Cl. X.R.

23—339, 343